(12) United States Patent
Cipolla et al.

(10) Patent No.: US 7,377,482 B2
(45) Date of Patent: May 27, 2008

(54) COMPOSITE TOROIDAL GASKET RING FOR BALL VALVES

(76) Inventors: Giovanni Cipolla, Via Dante 45, 26100 Cremona (CR) (IT); Sandro Bonomi, Via Partigiani 5, 25065 Lumezzane (BS) (IT)

( * ) Notice: Subject to any disclaimer, the term of this patent is extended or adjusted under 35 U.S.C. 154(b) by 0 days.

(21) Appl. No.: 10/202,234

(22) Filed: Jul. 24, 2002

(65) Prior Publication Data

US 2003/0030235 A1     Feb. 13, 2003

(30) Foreign Application Priority Data

Jul. 27, 2001     (IT) ........................ BS20010071 U

(51) Int. Cl.
*F16K 5/06* (2006.01)

(52) U.S. Cl. .................. 251/314; 251/315.02; 277/584

(58) Field of Classification Search ................ 277/549, 277/551, 569, 626, 627, 650, 652, 584–587, 277/905, 925; 251/175, 192, 315.01, 363, 251/315.02, 315.03, 314, 315.05, 315.06, 251/315.16

See application file for complete search history.

(56) References Cited

U.S. PATENT DOCUMENTS

| | | | | |
|---|---|---|---|---|
| 1,960,750 A | * | 5/1934 | Moore ........................ 277/626 |
| 2,385,941 A | * | 10/1945 | Reynolds .................... 277/561 |
| 3,090,593 A | * | 5/1963 | Pro .............................. 251/87 |
| 3,210,042 A | * | 10/1965 | Freeman ..................... 251/175 |
| 3,447,781 A | * | 6/1969 | Fawkes ................. 251/315.05 |
| 3,455,534 A | * | 7/1969 | Scaramucci ................. 251/175 |
| 3,508,736 A | * | 4/1970 | Pool et al. ................... 251/172 |
| 3,575,431 A | * | 4/1971 | Bryant ........................ 277/641 |
| 3,586,289 A | * | 6/1971 | Priese ......................... 251/214 |
| 3,603,603 A | * | 9/1971 | Woodson .................... 277/582 |
| 3,612,483 A | * | 10/1971 | Pool ............................ 251/306 |
| 3,642,290 A | * | 2/1972 | Millsap ....................... 277/551 |
| 3,652,183 A | * | 3/1972 | Pottharst, Jr. ............... 415/231 |
| 3,656,711 A | * | 4/1972 | Toelke ......................... 251/151 |
| 4,015,818 A | * | 4/1977 | Tawakol ..................... 251/307 |
| 4,053,166 A | * | 10/1977 | Domkowski ................ 277/558 |
| 4,113,268 A | * | 9/1978 | Simmons et al. ........... 277/641 |
| 4,157,170 A | * | 6/1979 | McClurg ................. 251/315.01 |
| 4,209,884 A | * | 7/1980 | Atkinson ............... 29/890.122 |
| 4,254,793 A | * | 3/1981 | Scaramucci ............ 137/246.22 |
| 4,268,045 A | * | 5/1981 | Traub .......................... 277/589 |
| 4,345,738 A | * | 8/1982 | Ripert .................... 251/315.01 |
| 4,411,407 A | * | 10/1983 | Ninomiya et al. ..... 251/315.05 |
| 4,428,590 A | * | 1/1984 | Pippert et al. .............. 277/638 |
| 4,457,491 A | * | 7/1984 | Dudman ...................... 251/317 |
| 4,511,150 A | * | 4/1985 | Seguenot .................... 277/345 |
| 4,699,387 A | * | 10/1987 | Buseth ........................ 277/556 |
| 4,709,932 A | * | 12/1987 | Edlund et al. .............. 277/550 |
| 4,796,858 A | * | 1/1989 | Kabel ......................... 251/171 |

(Continued)

FOREIGN PATENT DOCUMENTS

EP          339364 A2 * 11/1989

*Primary Examiner*—Jack W. Lavinder

(57) ABSTRACT

A gasket ring assembly for use with the rotating ball in a ball valve, the gasket ring assembly including a substantially L-shaped support and a toroidal elastomer gasket. The substantially L-shaped support includes a horizontal section and a vertical section. The horizontal section includes a groove and a tooth for holding the toroidal elastomer gasket in place. The toroidal elastomer gasket is fixedly attached to the substantially L-shaped support and is in direct contact with the outer surface of the rotating ball.

2 Claims, 2 Drawing Sheets

U.S. PATENT DOCUMENTS

| | | | |
|---|---|---|---|
| 4,834,398 A * | 5/1989 | Guzowski et al. | 277/624 |
| 4,850,601 A * | 7/1989 | Maier et al. | 277/553 |
| 4,915,355 A * | 4/1990 | Fort | 251/357 |
| 5,076,617 A * | 12/1991 | Bronnert | 277/608 |
| 5,346,230 A * | 9/1994 | Schumacher et al. | 277/551 |
| 5,380,015 A * | 1/1995 | Laflin et al. | 277/570 |
| 5,385,353 A * | 1/1995 | Edlund | 277/549 |
| 5,419,532 A * | 5/1995 | Fan | 251/315.08 |
| 5,472,216 A * | 12/1995 | Albertson et al. | 277/530 |
| 5,873,389 A * | 2/1999 | Cheng | 137/801 |
| 5,961,122 A * | 10/1999 | Marsi | 277/306 |
| 6,092,811 A * | 7/2000 | Bojarczuk et al. | 277/627 |
| 6,173,970 B1 * | 1/2001 | Choudary et al. | 277/644 |
| 6,328,316 B1 * | 12/2001 | Fukuhara et al. | 277/644 |
| 6,431,552 B1 * | 8/2002 | Ulrich | 277/558 |
| 6,497,415 B2 * | 12/2002 | Castleman et al. | 277/549 |
| 6,557,857 B1 * | 5/2003 | Goodman | 277/549 |
| 6,561,520 B2 * | 5/2003 | Kalsi et al. | 277/559 |

* cited by examiner

COMPOSITE TOROIDAL GASKET RING FOR BALL VALVES

This application claims the priority benefit of Italian Application for Patent, Serial No. BS2001U000071, entitled "Composite Toroidal Gasket Ring for Ball Valves," filed on Jul. 27, 2001, which is hereby incorporated by reference for all purposes.

STATEMENT REGARDING FEDERALLY SPONSORED RESEARCH/DEVELOPMENT

Not Applicable.

FIELD

The present invention is related to ring shaped sealing gaskets, and more particularly to a ring shaped sealing gaskets for use in ball valves.

BACKGROUND

Toroidal gasket rings, also known as "O" rings, are typically made of rubber and are commonly used as static seals in the presence of forces which are predominantly perpendicular at a diametric plane. Toroidal gasket rings are also commonly used as dynamic seals in the presence of forces which develop in particular in the diametric plane of the gasket itself.

Likewise, the use of ring-shaped gasket assemblies with quadrilateral sections of Polytetrafluoroethylene or PTFE (known under the trademark TEFLON) is also well-known. This type of gasket assembly presents mechanical and physical characteristics capable of reducing wear and tear; however, this type of gasket assembly does not provide the precise sealing performance of rubber gaskets.

Also well-known in the art is the use of ring-shaped gasket assemblies formed by the simple insertion of rubber toroidal gaskets into ring-shaped supports formed from PTFE. However, the performance of such gasket assemblies has proven to be less than optimal because of the ever present risk of separation of the rubber toroidal gasket from the ring shaped PTFE support. In addition, a loss of the seal between the gasket assembly and the rotating ball within the body of a ball valve can result because of the friction developed by the rotation of the ball on the ring-shaped gasket assembly within the body of the ball valve.

Accordingly, a need remains in the art for a gasket assembly for use in a ball valve which eliminates the above-mentioned inconveniences and makes it possible, to improve valve performance both in terms of ease of use and an increase in service life at the same time.

SUMMARY

The composite toroidal gasket ring assembly of the present invention for use in ball valves provides precise sealing directly against the rotating ball within the body of a ball valve, minimizes the risk of separation of the rubber toroidal ring from its support, and reduces friction forces. The reduction in friction forces reduces operating torque making the ball valve easier to use and increasing its service life.

The disclosed gasket ring assembly for use within a ball valve, includes a support piece and a toroidal elastomer gasket. The substantially L-shaped support piece further includes a horizontal section and a vertical section. On the inner surface of the horizontal section is a lower groove section and a raised tooth section. The toroidal elastomer gasket is fixedly attached to the support piece to enable contact with both the rotating ball and the innermost portion of the substantially U-shaped groove within the body of the ball valve in which the disclosed gasket ring assembly of the present invention is positioned.

BRIEF DESCRIPTION OF THE DRAWINGS

For a more complete understanding of the present invention, and for further details and advantages thereof, reference is made to the following Detailed Description of the Embodiments taken in conjunction with the following drawing figures, in which.

DETAILED DESCRIPTION OF THE EMBODIMENTS

Figure 1:
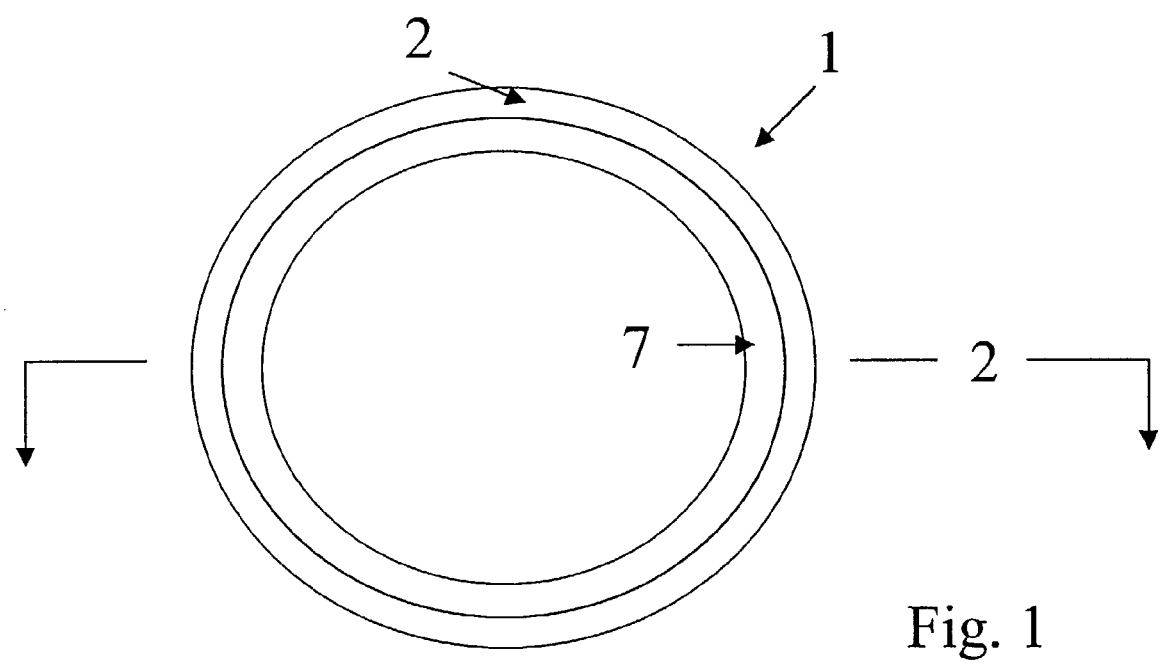
FIG. 1 is front view of a gasket ring assembly according to the present invention.

In the description which follows, like items are marked with the same numerals. The drawing figures are not necessarily drawn to scale and certain portions of the disclosed invention may be shown in exaggerated or in generalized form in the interest of clarity.

Figure 2:
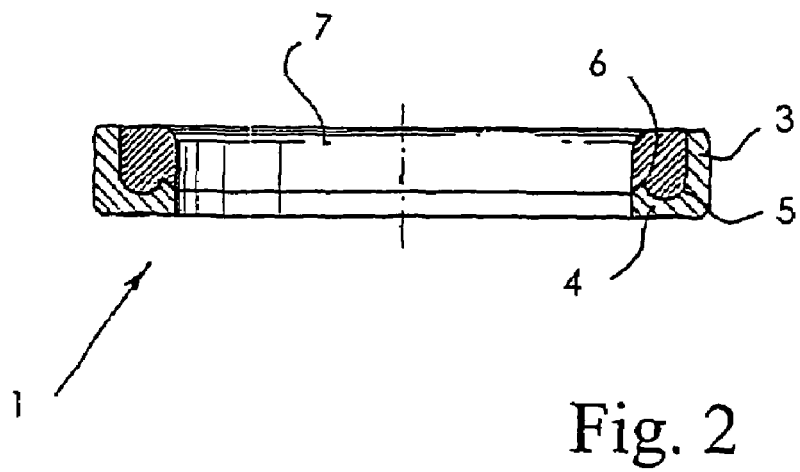
FIG. 2 is a sectional view taken at line 2 in FIG. 1 of a gasket ring assembly.

Referring now to FIGS. 1 and 2, the gasket ring assembly 1 of the present invention is shown. The ring shaped gasket assembly 1 includes a toroidal gasket 7 attached to a support piece 2. The ring shaped gasket assembly 1 is shown as a circle; however, other shapes, including oval, can be implemented without detracting from the spirit of the invention. The support piece 2 in the preferred embodiment is manufactured from PTFE and the toroidal gasket 7 is manufactured from an elastomer. The toroidal gasket 7 is fixedly attached to the support piece 2 using a cementation process. The cementation process includes the application of an adhesive substance to the toroidal gasket 7 or the use of another cementation processes known to those skilled in the art.

Figure 3:
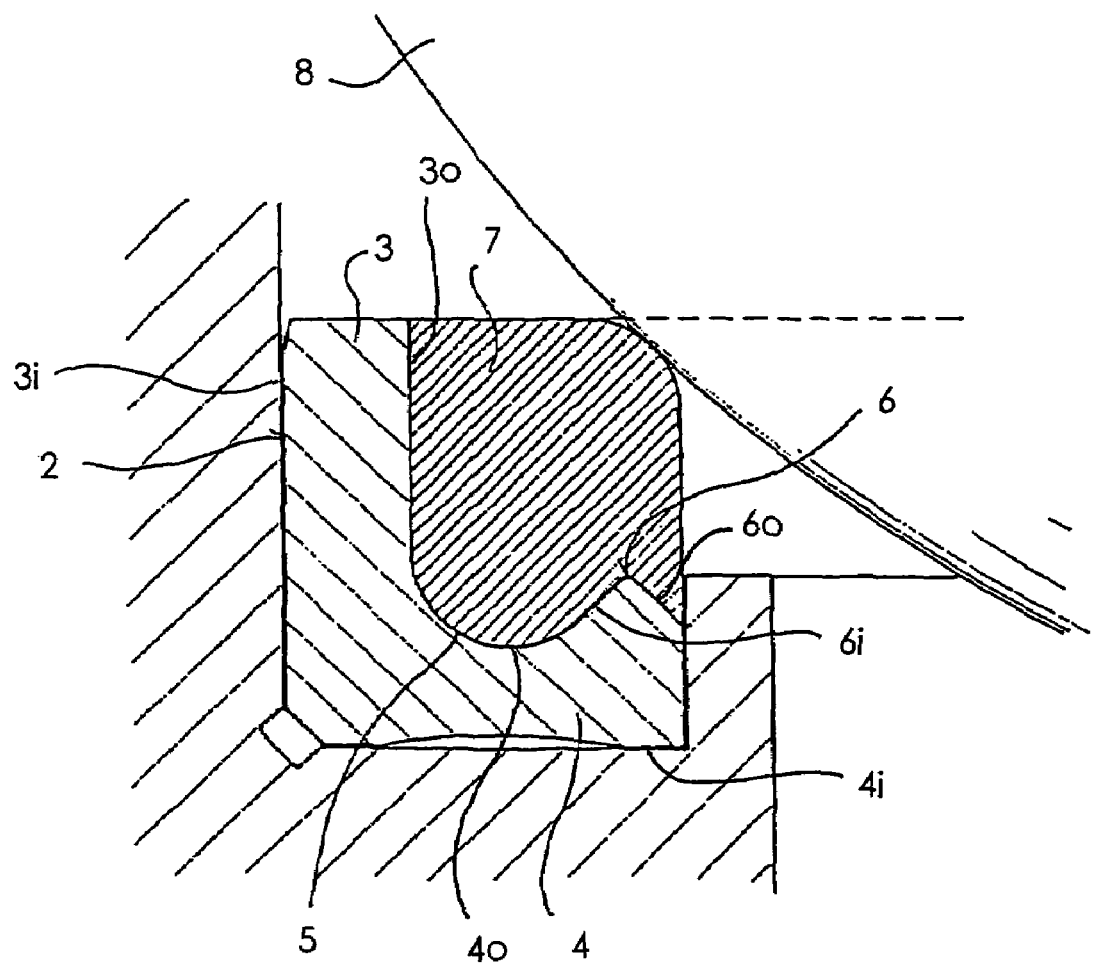
FIG. 3 is an exploded view of the gasket ring assembly within the body of a ball valve in relation to the rotating ball of the ball valve.

Referring now to FIG. 3, an exploded view of the ring shaped gasket assembly 1 within a U-shaped channel with the body of a ball valve and in contact with the arcuate outer surface of the rotating ball 8 of the ball valve is shown. The support piece 2 has a cross section which is substantially L-shaped with a vertical section 3 and a horizontal section 4. Both the vertical section 3 and the horizontal section 4 have an inner and an outer surface designated by the reference numbers 3i, 3o, 4i, and 4o. The inner surface 4i of the horizontal section 4 defines a lower groove portion 5 and an upper tooth portion 6. The upper tooth portion 6 is substantially perpendicular to the horizontal section 4 on which it resides and has an inner surface 6i and an outer surface 6o. According to the preferred embodiment of the invention, the toroidal gasket 7 is compressed into the lower groove portion 5 between the inner surface 3i of the vertical section 3 and the inner surface 6i of the upper tooth portion 6 and passes over the upper tooth portion 6. The toroidal gasket 7 is fixedly attached to the inner surface of the horizontal section 4 of the support piece 2 by means of the cementation process. The upper tooth portion 6 acts to impede movement of the toroidal gasket 7 during operation and further acts to keep the toroidal gasket 7 in a constant position relative to the support piece 2. The outer surfaces of the support piece 2 are in contact with the U-shaped channel 9 within the ball valve into which the gasket ring assembly of the present invention is inserted.

The toroidal gasket 7 is deformed by contact directly against the outer surface of the ball 8 and physically blocked from movement in the area defined by the horizontal section 4 and the vertical section 3 and by the upper tooth portion 6 of the support piece 2. The upper tooth portion 6 aligns the toroidal gasket 7 with the support piece 2 during the cementation process.

The ring-shaped gasket assembly 1 is inserted into the substantially U-shaped groove 9 in the body of the ball valve so that the outer surface of the rotating ball 8 of the ball valve is in constant contact with the toroidal gasket 7. The ring shaped gasket assembly 1 according to the disclosed embodiment makes it possible to maintain both the precise mechanical stability of the support piece 2 and a seal by the toroidal elastomer gasket 7 while at the same time reducing the dragging friction between the toroidal gasket 7 and the rotating ball 8 of the ball valve, thereby leading to easier operation of the ball valve itself. A close examination of FIG. 3 will reveal that the corner edge of the toroidal gasket 7 is also in contact with the innermost leg 10 of the substantially U-shaped channel 9 in which the ring shaped gasket assembly 1 is located. The ring shaped gasket assembly 1 also makes it possible to avoid problems deriving from rapid and important changes in the flow and the thrusts make on the rotating ball 8 by the liquid passing through it and, in particular, in the presence of so-called "water hammering".

Other embodiments of the invention will be apparent to those skilled in the art after considering this specification or practicing the disclosed invention. The specification and the disclosed embodiment are exemplary only, with the true scope of the invention being indicated in the following claims.

What is claimed is:

1. A gasket ring assembly for providing a fluid seal against the arcuate outer surface of a rotating ball when mounted within a substantially U-shaped channel within the body of a ball valve, the gasket ring assembly comprising:
   a substantially L-shaped circular outer support piece manufactured from polytetrafluoroethylene and constructed and arranged for insertion into the substantially U-shaped channel within the body of the ball valve, said substantially L-shaped circular outer support piece including a horizontal section having an inner surface and an outer surface and a vertical section having an inner surface and an outer surface;
   said inner surface of said horizontal section including a lower groove portion and an upper tooth section, said upper tooth section having an inner surface, an outer surface and extending substantially perpendicular to said horizontal section of said substantially L-shaped circular outer support piece;
   a toroidal elastomeric gasket including an outer edge and an inner edge;
   said toroidal elastomeric gasket being constructed and arranged for both cemented attachment to said inner surface of said vertical section and said lower groove portion and said upper tooth section of said inner surface of said horizontal section of said substantially L-shaped circular outer support piece and for compression between said inner surface of said upper tooth section and said inner surface of said vertical section;
   said outer edge of said toroidal elastomeric gasket being constructed and arranged for constant sealing engagement against the arcuate outer surface of the rotating ball.

2. The gasket ring assembly of claim 1, wherein said upper portion tooth portion impedes movement of said toroidal elastomer gasket with respect to said substantially L-shaped circular outer support piece.

\* \* \* \* \*